(12) United States Patent
Yamamoto

(10) Patent No.: US 11,183,955 B2
(45) Date of Patent: Nov. 23, 2021

(54) METHOD FOR CORRECTING MAGNETIC FIELD POSITION ERROR IN ELECTRIC MOTOR

(71) Applicant: HOKUTO CONTROL Co., Ltd., Nagano (JP)

(72) Inventor: Kiyoshi Yamamoto, Nagano (JP)

(73) Assignee: HOKUTO CONTROL CO., LTD., Nagano (JP)

( * ) Notice: Subject to any disclaimer, the term of this patent is extended or adjusted under 35 U.S.C. 154(b) by 347 days.

(21) Appl. No.: 16/341,348

(22) PCT Filed: Dec. 12, 2017

(86) PCT No.: PCT/JP2017/044528
§ 371 (c)(1),
(2) Date: Apr. 11, 2019

(87) PCT Pub. No.: WO2018/110538
PCT Pub. Date: Jun. 21, 2018

(65) Prior Publication Data
US 2021/0297020 A1    Sep. 23, 2021

(30) Foreign Application Priority Data
Dec. 13, 2016  (JP) .............................. JP2016-241599

(51) Int. Cl.
*H02P 6/185*    (2016.01)
*H02P 6/21*     (2016.01)

(52) U.S. Cl.
CPC ................ *H02P 6/185* (2013.01); *H02P 6/21* (2016.02)

(58) Field of Classification Search
CPC ................................. H02P 6/185; H02P 6/21
(Continued)

(56) References Cited

U.S. PATENT DOCUMENTS 5,929,590 A * 7/1999 Tang .................... H02P 9/40
                                                 318/701
6,172,498 B1    1/2001 Schmidt et al.

FOREIGN PATENT DOCUMENTS

JP    2006254626    9/2006
JP    2010136622    6/2010
(Continued)

OTHER PUBLICATIONS

International Search Report for PCT/JP2017/044528, dated Mar. 16, 2018.
(Continued)

*Primary Examiner* — David Luo
(74) *Attorney, Agent, or Firm* — Stephen J. Weyer, Esq.; Stites & Harbison, PLLC

(57) ABSTRACT

The present invention addresses the problem of providing a method which makes it possible to simply evaluate an output of an initial position detection signal for a permanent magnetic field, along with providing a method for correcting errors that occur in the initial position detection signal. As a means for solving said problem, an MPU (51) obtains a correction value in which an offset error has been corrected by multiplying a first measurement value or a second measurement value, which are measured for each conduction pattern when an offset error occurs during position detection of a permanent magnetic field, by a correction coefficient A and estimates the position of the permanent magnetic field on the basis of the correction value.

4 Claims, 6 Drawing Sheets

(58) Field of Classification Search
USPC .............................. 318/400.32, 400.01, 700
See application file for complete search history.

(56) References Cited

FOREIGN PATENT DOCUMENTS

| JP | 2014503170 | 2/2014 |
| JP | 2015100206 | 5/2015 |

OTHER PUBLICATIONS

Written Opinion of the International Searching Authority for PCT/JP2017/044528, dated Mar. 16, 2018.

\* cited by examiner

ELECTRIC ANGLE

ELECTRIC ANGLE

METHOD FOR CORRECTING MAGNETIC FIELD POSITION ERROR IN ELECTRIC MOTOR

TECHNICAL FIELD

The present invention relates to a method for correcting an error of a magnetic field position detection signal in an electric motor, e.g., sensorless motor, linear actuator.

BACKGROUND ART

Conventionally, motors having brushes have been used as small DC motors, but they have problems of brush noise, electric noise, low durability, etc., so brushless motors have been developed to solve the problems. These days, sensorless motors, which have no position sensors, draw attention as compact, light, tough and low-cost motors, and they were firstly employed in information technology devices, e.g., hard disk drive unit, and then employed in home electric appliances, car-mounted devices, etc. due to progression of vector control technology.

A three-phase brushless direct current (DC) motor is shown in FIG. 1 as an example of a sensorless motor having no position sensor. A rotor 2 is capable of rotating about a rotor shaft 1 and has a permanent magnet 3 having a pair of magnetic poles, i.e., S-pole and N-pole. A type of magnetic pole structure (IPM, SPM) and a number of magnetic poles may be optionally selected. In a stator 4, armature coils (coils) U, V and W are formed on pole teeth, which are provided with a phase difference of 120°, and they are star-connected through a common point C.

An example of a block diagram of a conventional sensorless drive circuit is shown in FIG. 2. MOTOR is a three-phase sensorless motor. An MPU 51 is a microcontroller (control means). An INV 52 is an inverter circuit (output means) having a three-phase half bridge structure. An RS 53 is a current sensor. An ADC 54 is an A/D converter for converting a current value into a digital value. Note that, an actual circuit further has an electric source, an input part of a position sensor, a zero-cross comparator, a dummy common producing part, a host interface part, etc. which are omitted for easy explanation.

A timing chart of a typical example of 120° conduction for driving the three-phase brushless motor is shown in FIG. 3. In a section 1, rectangular-wave conduction is performed from the U-phase to the V-phase; in a section 2, rectangular-wave conduction is performed from the U-phase to the W-phase; in a section 3, rectangular-wave conduction is performed from the V-phase to the W-phase; in a section 4, rectangular-wave conduction is performed from the V-phase to the U-phase; in a section 5, rectangular-wave conduction is performed from the W-phase to the U-phase; and in a section 6, rectangular-wave conduction is performed from the W-phase to the V-phase. Dotted lines are waveforms of induced voltages. HU to HW are waveforms of outputs of hall sensors provided in the motor, and excitation-switching in the conventional brushless DC motor having the position sensor is performed on the basis of signals of the sensors.

On the other hand, in the sensorless driving manner, positions of the rotor are detected on the basis of the induced voltages, but the rotor cannot be started when a speed is zero because no voltages are induced and the position of the rotor cannot be detected. To detect an initial position from variation of reluctance or variation of magnetic resistance, the coil current sensor and the current detecting circuit are provided, and the position of the rotor can be estimated by current response which is caused by applying sine-wave coil currents to the coils by a PWM driving manner using the inverter. Prior arts, in each of which coil currents are detected by the current sensor and the current detecting circuit, are disclosed in Japanese Laid-open Patent Publication No. 2006-254626 (Patent Literature 1) and Translation of PCT Application No. 2014-503170 (Patent Literature 2).

CITATION LIST

Patent Literature

Patent Literature 1: Japanese Laid-open Patent Publication No. 2006-254626
Patent Literature 2: Translation of PCT Application No. 2014-503170

SUMMARY OF INVENTION

Technical Problem

To detect the initial position of the sensorless motor, it is necessary to detect periodical variation responding to magnetic field positions by applying sensing pulses. Thus, generally, estimating magnetic field positions at a speed of zero or at a low speed is performed by detecting reluctance variation, which is caused by magnetic field structure, magnetic resistance variation, which is caused by magnetic saturation, etc., but an amount of variation of output, which responds to displacement detected from a position detection signal, is minute.

Since the amount of variation of output of the position detection signal is minute, it is necessary for a manufacturer operating a motor production-line or a user to know margins of signal level, intrinsic errors of motors, etc., but detection processes are complex, so no suitable detecting means has been established.

Further, magnetic properties of coils of magnetic circuits in motors are widely varied by magnetization errors, variation of materials, etc., and output properties, wire capacities, etc. of driving circuits are varied. Therefore, errors of amplitude, offset, phase, etc. in the position detection signals will be caused in each of coils. However, no method for easily correcting the errors exists at present, so high accuracy being approximate to a mathematical model is required in the motor and a production cost must be increased. Further, reducing the errors is limited, and considerable errors actually exist. As a result, in case that the amount of variation of the position detection signal is small, the signal error is nearly equal to the amount of variation of the signal, so the position detection cannot be performed.

Therefore, it is desired that the error of the position detection signal is corrected in a process of assembling the driving circuit to the motor, but there are no correcting means which can be easily operated in the production-line or by the user, so use application of the sensorless motor is limited, the motor must be open loop-started without detecting the initial position, or use of the sensorless motor must be abandoned and a hall sensor or an encoder must be employed.

The present invention addresses the above described problems, and an object is to provide a method which makes it possible to simply evaluate an output of an initial position detection signal for a permanent magnetic field, along with providing a method for correcting errors that occur in the initial position detection signal, the position detection can be possible in the conventional motor system, in which the initial position detection is difficult, so as to expand use application of sensorless motor systems.

Solution to Problem

The method for correcting a magnetic field position error in an electric motor which comprises a rotor having a permanent magnetic field and a stator having star-connected three-phase coils U, V and W and which is started by supplying constant voltage DC electric power and applying 120° rectangular-wave, said electric motor further comprises: output means for applying electricity to the three-phase coils through a three-phase half-bridge type invertor circuit; control means for switching-controlling the output means, according to a rotation command from a superordinate controller, so as to switch an exciting state; and current detection means for detecting coil currents, the current detection means being connected to an earth-side terminal of the output means, a conduction direction from a coil end to a common side is a forward direction, a conduction direction from the common side to the coil end is a reverse direction, and one phase coil is defined as a phase to be measured in six conduction patterns, in which electric conductions are performed in a reverse direction for the U-phase, a forward direction for the W-phase, a reverse direction for the V-phase, a forward direction for the U-phase, a reverse direction for the W-phase and a forward direction for the V-phase in this order, at each stopping position starting from an electric angle of 0°. In a state where an output shaft of the electric motor is released, the control means performing: a step of controlling the output means so as to perform stationary excitation in a prescribed conduction pattern and perform self-excitation positioning of the permanent magnetic field at a pitch of an electric angle of 60° from the electric angle of 0°; a step of measuring coil current values, which are detected by the current detection means when performing three-phase sensing conduction in which one-phase conduction is performed in the phase to be measured, is performed at each stopping position of the permanent magnetic field, and storing the coil current values as first measurement values, and storing the coil current values as first measurement values; a step of measuring coil current values, which are detected by the current detection means when three-phase sensing conduction is performed, in the reverse directions, still at the stopping position of the permanent magnetic field and storing the coil current values as third measurement values; a step of measuring coil current values, which are detected by the current detection means when three-phase sensing conduction is performed, in the directions for measuring the first measurement values, at positions of the permanent magnetic field rotated an electric angle of 90° from the stopping positions where self-excitation positioning is performed, and storing the coil current values as second measurement values; a step of obtaining coil current values of the phase to be measured, which correspond to the first measurement value, the second measurement value and the third measurement value, for each of the six conduction patterns and storing the coil current values in the control means; and a step of calculating correction coefficients A, which are used to make a standard value of an optional phase, which is the first measurement value or the second measurement value thereof, equal to the measurement values of the rest five phases, for each of the six conduction patterns and storing the correction coefficients A in the control means, and the control means obtains a correction value in which an offset error has been corrected by multiplying the first measurement value or the second measurement value, which are measured for each of the six conduction patterns when an offset error occurs during the position detection of the permanent magnetic field, by the correction coefficient A and estimates the position of the permanent magnetic field on the basis of the correction value.

With the method, estimation errors of the permanent magnetic field can be reduced by performing the sensing conduction and correcting the offset errors of the first measurement values or the second measurement values for the six conduction patterns.

The control means stores the measurement values, which are obtained by the evaluation measurement including the above described steps, they can be sent to the superordinate controller and displayed, so that the function of detecting the initial position of the permanent magnetic field can be simply evaluated from the measurement values. For example, by comparing the first measurement values of the phases, an amount of interphase offset of the position detection signal can be known, so that interphase unbalance of the motor and the driving circuit can be found, and validity of a current value can be evaluated simultaneously. An amount of detecting variation of magnetic resistance, which is caused by magnetic saturation when the conduction direction is changed, can be known from the difference between the first measurement value and the third measurement value, and an accuracy of detecting the magnetic polarities and validity of a value of the sensing current causing magnetic saturation can be evaluated. Further, a synthetic variation of the reluctance variation and the magnetic resistance variation can be evaluated from the amplitude of the position detection signal by obtaining the difference between the first measurement value and the second measurement value.

Another method for correcting a magnetic field position error in an electric motor which comprises a rotor having a permanent magnetic field and a stator having star-connected three-phase coils U, V and W and which is started by supplying constant voltage DC electric power and applying 120° rectangular-wave, said electric motor further comprises: output means for applying electricity to the three-phase coils through a three-phase half-bridge type invertor circuit; control means for switching-controlling the output means, according to a rotation command from a superordinate controller, so as to switch an exciting state; and current detection means for detecting coil currents, the current detection means being connected to an earth-side terminal of the output means, a conduction direction from a coil end to a common side is a forward direction, a conduction direction from the common side to the coil end is a reverse direction, and one phase coil is defined as a phase to be measured in six conduction patterns, in which electric conductions are performed in a reverse direction for the U-phase, a forward direction for the W-phase, a reverse direction for the V-phase, a forward direction for the U-phase, a reverse direction for the W-phase and a forward direction for the V-phase in this order, at each stopping position starting from an electric angle of 0°. In a state where an output shaft of the electric motor is released, the control means performing: a step of controlling the output means so as to perform stationary excitation in a prescribed conduction pattern and perform self-excitation positioning at a pitch of an electric angle of 60° from the electric angle of 0°; a step of measuring coil current values, which are detected by the current detection means when performing three-phase sensing conduction in which one-phase conduction is performed in the phase to be measured, is performed at each stopping position of the permanent magnetic field, and storing the coil current values as first measurement values; a step of measuring coil current values, which are detected by the current detection means when three-phase sensing conduction is performed, in the directions for measuring the first measurement values, at positions rotated an electric angle of 90° from the stopping positions where self-excitation positioning is performed, and storing the coil current values as second measurement values; a step of obtaining coil current values of the phase to be measured, which correspond to the first measurement value and the second measurement value, for each of the six conduction patterns and storing the coil current values in the control means; and a step of obtaining correction coefficients B, which is used to make a standard value of an optional phase, which is an amplitude of deviation of detection signals obtained from a difference between the first measurement value and the second measurement value, equal to amplitudes of the rest five phases, for each of the six conduction patterns and storing the second measurement values and the correction coefficients B, and the control means obtains a correction value in which an amplitude error has been corrected by multiplying a difference between the measurement value of the coil current and the second measurement value, which are measured for each of the six conduction patterns, by the correction coefficient B and estimates the position of the permanent magnetic field on the basis of the correction value.

With this method, the effect of reducing estimation errors of the position of the permanent magnetic field can be improved by performing the sensing conduction and correcting the amplitude errors for the six conduction patterns.

Note that, the self-excitation positioning need not be required when the measurement is performed to obtain the correction coefficients A and B, and an external driving unit may be connected to the output shaft of the electric motor so as to rotate the output shaft of the electric motor a prescribed angle for positioning.

In case that the positioning is performed by using an external force, phase errors will occur during the measurement, but they are minute and can be ignored.

Advantageous Effects of Invention

The errors of the signal for detecting the permanent magnetic field position are caused by phase errors, offset errors and amplitude errors. In the present invention, mechanical angles are not used as phase angles; electric angles of the same electric angle system are used as phase angles when the first to third measurement values are measured by the three-phase sensing conduction and when the permanent magnetic field positions are detected during operation, so that the phase errors can be highly reduced. The offset errors of the measurement values or the amplitude errors, which occur when detecting the permanent magnetic field position, are simultaneously mathematically corrected, by the correction coefficients, during the measurement, so that the position can be correctly detected. Therefore, even in a conventional surface magnet type motor, in which position detection is difficult and reluctance deviation is small, and a conventional slotless motor, in which magnetic resistance deviation is small, the position detection can be performed, so that use application of the sensorless motor can be expanded.

An accuracy of position detection can be improved by correcting errors, the sensing current value can be smaller than that of the conventional manner, so that a sensing time can be shortened, and loads of the motor and the driving circuit can be reduced.

In case of applying the method to the conventional apparatus, the apparatus can be operated, by changing programs only, without changing a hardware, so that the plug-in can be performed at low cost.

Conventionally, it is difficult for a production-line operator or a user to evaluate the function of position detection, but the function can be evaluated for several seconds by employing the present invention, so that the motor system can be safely operated with knowing margin and stability of the position detection signal.

DESCRIPTION OF EMBODIMENTS

Embodiments of the method for correcting a magnetic field position error in an electric motor relating to the present invention will now be described with reference to the attached drawings. A sensorless motor, which has a rotor having a permanent magnetic field and a stator including star-connected coils arranged with a phase difference of 120° and in which phase ends are connected to output means, will be explained as an example of the electric motor of the present invention. Note that, the present invention can be applied to a linear actuator which is reciprocally moved by a motor.

A method for correcting a magnetic field position error in the sensorless motor, which is a three-phase permanent magnetic field type synchronous motor and which is sensorless-driven, will be explained with reference to a structure of a sensorless motor driving system.

Figure 1:
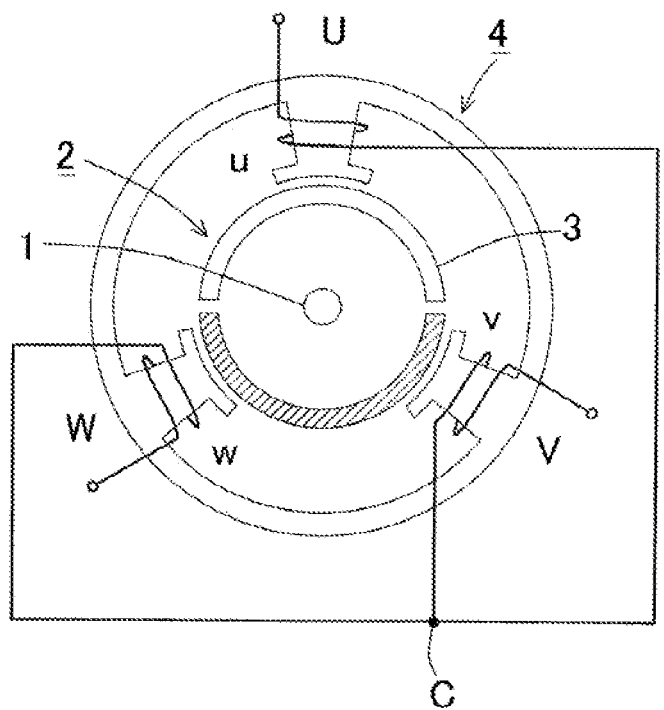
FIG. 1 is a structure diagram of a three-phase brushless DC motor.

An embodiment of a three-phase brushless DC motor relating to the present invention is shown in FIG. 1. For example, the three-phase brushless DC motor has a two-pole permanent magnet rotor and a stator 4 having three slots. The motor may be an inner rotor type or an outer rotor type. Further, the permanent magnetic field may be an implanted permanent magnet (IPM) type or a surface permanent magnet (SPM) type.

In FIG. 1, the rotor 2 is integrated with a rotor shaft 1, and a two-pole permanent magnet 3 is provided as a magnetic field. The stator 4 facing the permanent magnet 3 has pole teeth U, V and W, which are arranged with a phase difference of 120°. Coils u, v and w are respectively formed on the pole teeth U, V and W, the phases are mutually star-connected at common C, and they are connected to the motor driving system, which will be described later, as the three-phase brushless DC motor. Note that, a common line is not required, so it is omitted in the drawing.

Figure 2:
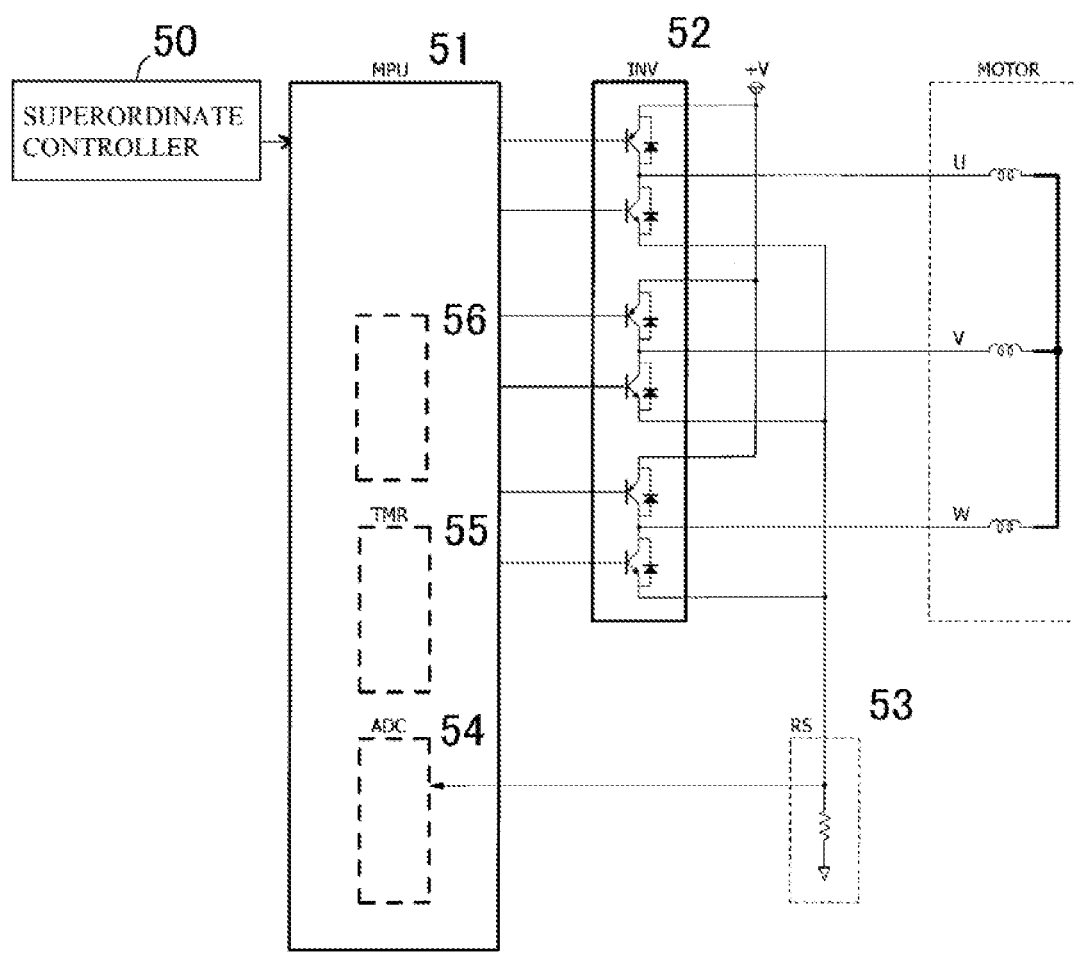
FIG. 2 is a block diagram of a conventional motor driving circuit.

Next, an example of a motor driving circuit for the three-phase sensorless motor is shown in FIG. 2.

A starting manner of the motor is a 120°-conduction bipolar rectangular-wave excitation manner.

MOTOR is the three-phase sensorless motor. An MPU 51 is a microcontroller (control means). The MPU 51 stores six conduction patterns for the three-phase coils (U, V and W) and magnetic field position information for assigning excitation switching sections (section 1 to section 6) of 120°-conduction which correspond to the conduction patterns and switching-controls the output means, on the basis of rotation commands sent from a superordinate controller, so as to optionally switch an excitation state.

A three-phase half-bridge type invertor circuit 52 (INV: output means) applies electricity to the three-phase coils so as to switch an excitation phase or perform a switching action, e.g., PWM control, for controlling motor torque. The invertor circuit 52 includes diodes, which are respectively connected in reversely parallel to switching elements, and half-bridge type switching circuits for three phases, which are capable of being optionally connected to a positive pole power source line and an earth power source line.

A current sensor 53 (RS: current detection means) is serially connected to a common earth-side terminal of the invertor circuit 52. The current sensor 53 generates reference voltage (standard voltage value), which corresponds to a current threshold value and which is capable of detecting magnetic resistance variation caused by field polarity. Note that, in the present embodiment, a shunt resistance r is used as the current sensor 53. Output of the current sensor 53 (current detection means) is sent to an A/D converter 54 (ADC: Analog-to-Digital Converter, A/D converter means). The A/D converter 54 measures coil current values from output of the current sensor 53. A timer 55 (TMR: timer means) for measuring conduction time of sensing pulses is provided. The timer 55 measures elapse of a prescribed conduction time of sensing pulses. High performances need not be required for the A/D converter 54 and the timer 55, and they may be inexpensive ones, so a built-in converter and a built-in timer of the MPU 51 can be practically used. For example, a 12-bit ADC, whose data acquisition time is about 1 μs and conversion time is about 10 μs, is included in a general-purpose micro processing unit and has sufficient performance. An MPU clock, which is a low speed clock, e.g., about 20 MHz, may be used as the timer 55. Further, the MPU 51 includes ROMs (Read Only Memories) and non-volatile memories 56 (storing section), e.g., flash memories, are included in the MPU 51.

Principle of detecting the permanent magnetic field position will be explained.

Figure 4:
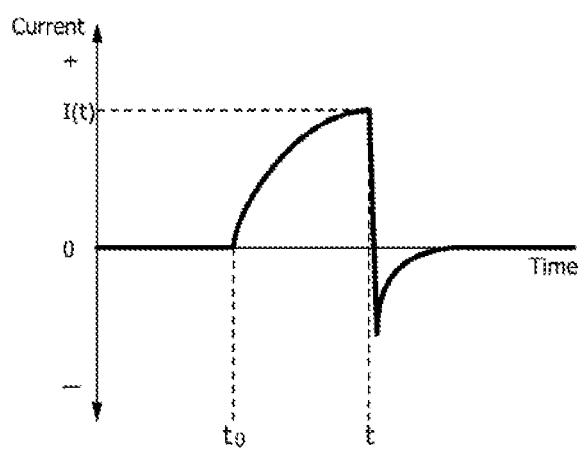
FIG. 4 is a waveform chart of a sensing pulse.

A waveform of a constant-voltage rectangular pulse applied to a coil is shown in FIG. 4.

Increase of a current when applying the constant-voltage pulse to the coil is indicated as a following formula:

$$I(t)=(L/R)*(1-e^{(-t*R/L)})$$

wherein I is coil current, L is coil inductance and R is coil resistance.

If a pulse time t is constant, a peak current value I(t) reflects the inductance L, or if the peak current value I(t) is constant, the pulse time t reflects the inductance L.

In the following explanation, the position of the permanent magnetic field is estimated by measuring the peak current when applying a pulse for a prescribed time. Note that, the principle of detecting the permanent magnetic field position is not limited to the above described principle, so other principles, e.g., measuring a reaching time of a peak current, measuring coil stored energy, may be employed.

Next, an example of measuring a position detection signal will be explained.

In case that a first axis is defined as a direction of an electric angle of 0° where a polar direction of a coil to be measured and a polar direction of a magnetic field are opposite to each other, a second axis is defined as a direction of an electric angle of 90° and a third axis is defined as a direction of an electric angle of 180°, inductance of the first axis is minimized, so a current increasing rate is great and a position detection signal (a first measurement value) is maximized at this position. Inductance of the second axis is maximized, so a current increasing rate is small and a position detection signal (a second measurement value) is minimized at this position. Reluctance has two-periodicity, so the first measurement value is equal to a third measurement value. (reverse-direction conduction) However, magnetic resistance is varied by magnetic saturation caused by a large current, so magnetic field polarity is reflected and the third measurement value is reduced.

Reluctance component and magnetic resistance component of inductance will be separately explained.

Variation of a peak current caused by reluctance has two-periodicity, so that it for one phase approximates the following formula:

$$\Delta Ia=\cos(2\theta),\cos(2\theta+\pi)$$

wherein θ is a magnetic field position. Those for the rest phases can be obtained by adding +120° and −120° to θ.

Variation of a peak current caused by magnetic resistance has one-periodicity, so that it for one phase approximates the following formula:

$$\Delta Ib=\Delta Ia$$

wherein ΔIb=−1 when θ is 0 to π/2 and 3π/2 to 2π. Those for the rest phases can be obtained by adding +120° and −120° to θ.

Figure 5:
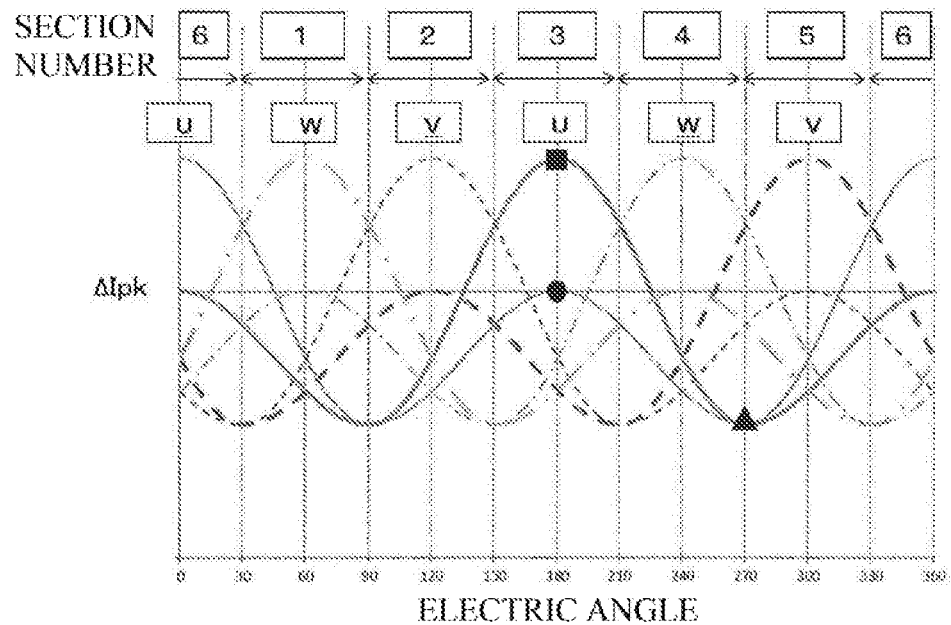
FIG. 5 is a waveform chart of approximate waveforms of position detection signals.

Approximate waveforms of peak current variation ΔIpk (=ΔIa+ΔIb) is shown in FIG. 5. A horizontal axis indicates a rotational angle θ of the rotor, and a vertical axis indicates the peak current value while performing sensing conduction. Since electric conduction is performed, in a forward direction and a reverse direction, for each of three coils, six conduction patterns are obtained, so six-phase waveforms are observed. Names of reverse-direction conduction patterns are underlined. For reference, the first measurement value (maximum value) of the forward-direction conduction pattern of the U-phase is indicated by a mark of ■, the second measurement value (minimum value) thereof is indicated by a mark of ▲, and the third measurement value (reverse-direction conduction) is indicated by a mark of ●.

The first measurement values (maximum values) and the second measurement values (minimum values) of the conduction patterns occur at a pitch of an electric angle of 30° from an angle of 0°, so the position of the rotor can be estimated from the waveform. For example, the value in the U-phase is maximized in a section 3, which is a section from electric angle 150° to an electric angle 210°, so if the measurement value of the U-phase is maximum among the six measurement values, it is judged that the rotor locates in the section 3. The positions in the rest sections can be judged as well.

Figure 6:
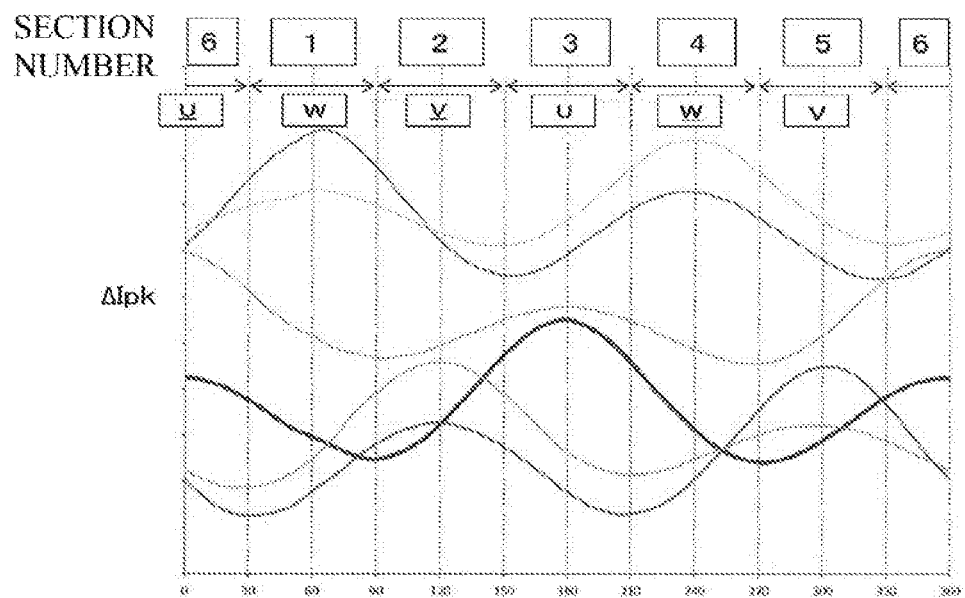
FIG. 6 is a waveform chart of actually measured waveforms of the position detection signals.

Waveforms measured by the above described manner for measuring the peak coil current are shown in FIG. 6. A three-phase slotless motor was rotated, by external force, at an angle pitch of 1° and measured the values for the six conduction patterns at each pitch, and 2160 data for electric angle of 360° were plotted therein.

The waveforms were similar, and two-periodicity components caused by reluctance variation and one-periodicity components caused by magnetic resistance variation were observed in each of the waveforms. However, large errors of offsets or amplitudes occurred between the conduction patterns, and the waveforms were extremely different from the approximate waveforms, so it is impossible to employ the waveforms for precise position detection.

Figure 7:
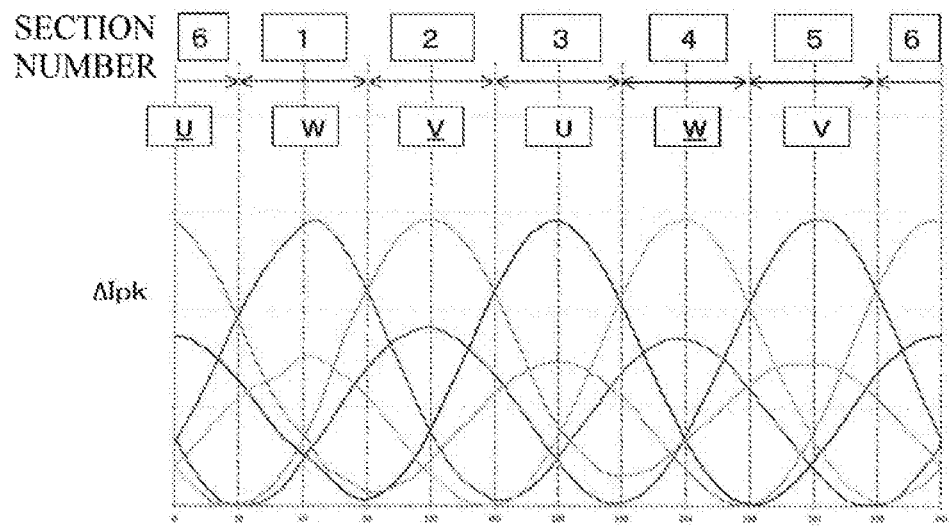
FIG. 7 is a waveform chart of the actually measured waveforms of the position detection signals in which errors are corrected.

Corrected waveforms, in which error correction (described later) is performed for the measured waveforms shown in FIG. 6, is shown in FIG. 7. They are similar to the approximate waveforms, and there are few errors therein. By employing the error correction, precise position detection can be performed even in a conventional case in which precise position detection cannot be performed.

Evaluation measurement will be explained.

The evaluation measurement is one of self-tuning manners, and a motor single-handedly positions a rotor and detects the rotor positions before operation, and then obtains measurement values and correction coefficients for the error correction. In the present embodiment, it is necessary to obtain position detection data and calculate the correction coefficients before operation so as to perform the error correction while operation. Further, it is difficult to know noise margin and accuracy of the position detection signals while normal operation of a motor system. Thus, the evaluation measurement can be performed by reading measurement values of the position detection signals before operation and judging position detection performance.

However, it is not realistic to perform the multipoint measurement for the entire range of electric angle while performing the evaluation measurement due to load and measurement time of a driving unit. Thus, positioning is performed at a pitch of 30° by stationary excitation (forcible commutation) of the driving unit, and the first measurement values, the second measurement values and the third measurement values are measured for the six conduction patterns. Six or 12 data out of the obtained 18 data, i.e., 6 patterns×3 data, are used to obtain the error correction coefficients (described later). The correction coefficients are stored in the nonvolatile memory 56 of the storing section, and they are used for the position detection while operation.

On the other hand, the superordinate controller 50 can evaluate the position detection performance, before operation, by reading some of the obtained data. For example, it is possible to judge if a sensing current value is optimum or not from the first measurement value of optional one of the conduction patterns. An amount of varying inductance, etc. can be known from a difference between the first measurement value and the second measurement value (the first measurement value–the second measurement value), i.e., amplitude. It is possible to judge if field polarity is securely detected or not from a difference between the first measurement value and the third measurement value (the first measurement value–the third measurement value). Further, variation of magnetic circuit properties of coils and variation of driving circuit properties can be known by numerical comparison with data of other conduction patterns.

The above described evaluation measurement may be performed once before operating the motor system, a necessary time is about 20 seconds, and the measurement can be performed automatically, so task of a user can be reduced.

The error correction manner will be further explained.

It is thought that factors of causing the errors are phase errors, offset errors and amplitude errors, and the correction coefficients for said factors, which have been already obtained by the above described evaluation measurement, are used, in the present embodiment, to correct the errors.

Firstly, a principle of correcting phase errors will be explained.

To correct the phase errors, positioning of the permanent magnetic field is performed, by setup conduction, in a state where an output motor shaft is released. The setup conduction means that self-excitation positioning at a desired position is performed by one-phase conduction, two-phase conduction or three-phase conduction. Unlike the one-phase conduction, the two-phase conduction and the three-phase conduction have holding power of the rotor. Note that, positioning of the permanent magnetic field at a self-excitation position and at a position separated an electric angle of 180° cannot be performed in a stopping state, so positioning of the permanent magnetic field may be performed once at a position shifted an electric angle of 90°, i.e., performing two-step positioning.

Figure 3:
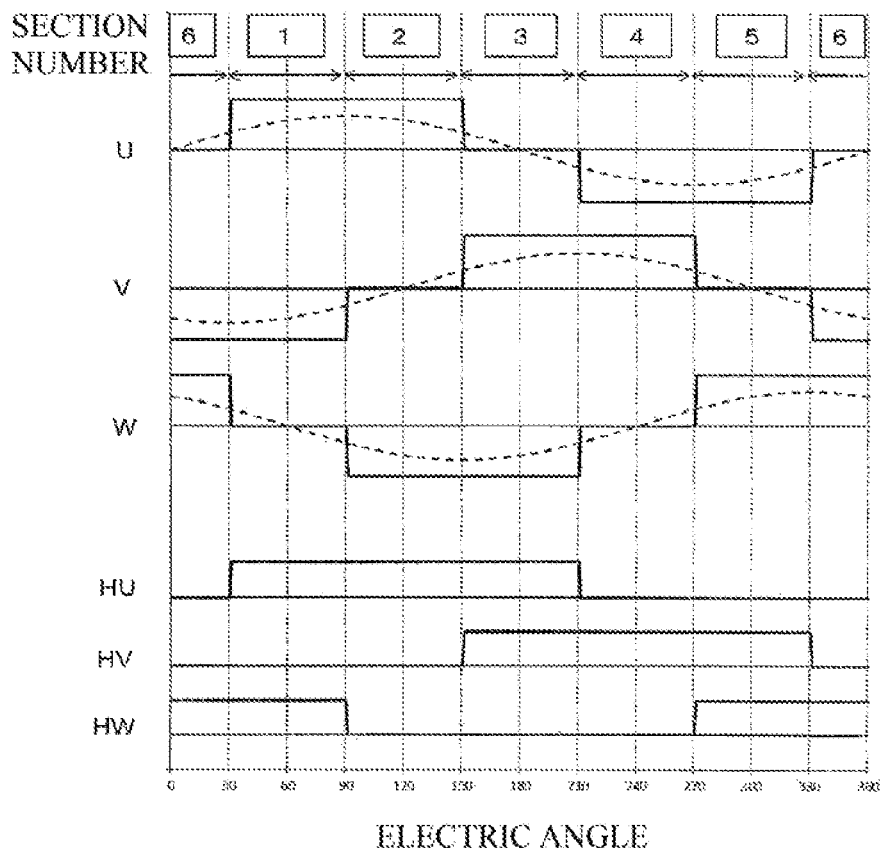
FIG. 3 is a timing chart of 120° conduction.

Waveforms of induced voltage of the coils are shown in FIG. 3. For example, in a case that electricity is continuously applied, in the forward direction, to the U-phase only by the one-phase conduction manner, the motor is rotated rightward in a section from 0° to 180° and rotated leftward in a section from 180° to 360°, and then stops at a 180° phase angle position which is a torque balance point. In case that the U-phase is connected to power source potential, by the three-phase conduction (U-VW excitation), and the V-phase and the W-phase are connected to GND, the motor stops at the 180° phase angle position. This position indicates the first axis when the forward-direction conduction is performed for the U-phase.

The second axis can be positioned, by the setup conduction, as well. For example, in a case that electricity is applied, in the forward direction, to the U-phase, a phase angle of the second axis is 270°; and in a case that the V-phase is connected to the power source potential, the W-phase is connected to the GND and the two-phase conduction (V-W excitation) is performed, and the second axis is positioned at 270°.

The third axis can be obtained by changing the conduction direction to the opposite direction and can be measured by performing the conduction in the reverse-direction still at the position of the first axis. Therefore, the third axis is positioned by the setup conduction.

If an external force is used when performing the evaluation measurement, positions of the permanent magnetic field are defined by mechanical angles, but rotational angles of the rotor while operation are electric angles, so there is possibility that phase errors will be caused by unbalance of magnetic circuits, etc. To eliminate the phase errors, magnetic circuit properties of a motor and output properties of a driving circuit must have high accuracy like a mathematical model, but it is realistically impossible. Thus, in the present embodiment, self-excitation positioning of the permanent magnetic field, which is performed by the setup conduction without using an external force, is employed when the evaluation measurement is performed. With this manner, desired positioning, which reflects magnetic circuit properties and output properties of the driving circuit, can be performed, so that the phase errors with respect to the detected permanent magnetic field position can be prevented.

Next, a manner for correcting offset errors will be explained.

Figure 8:
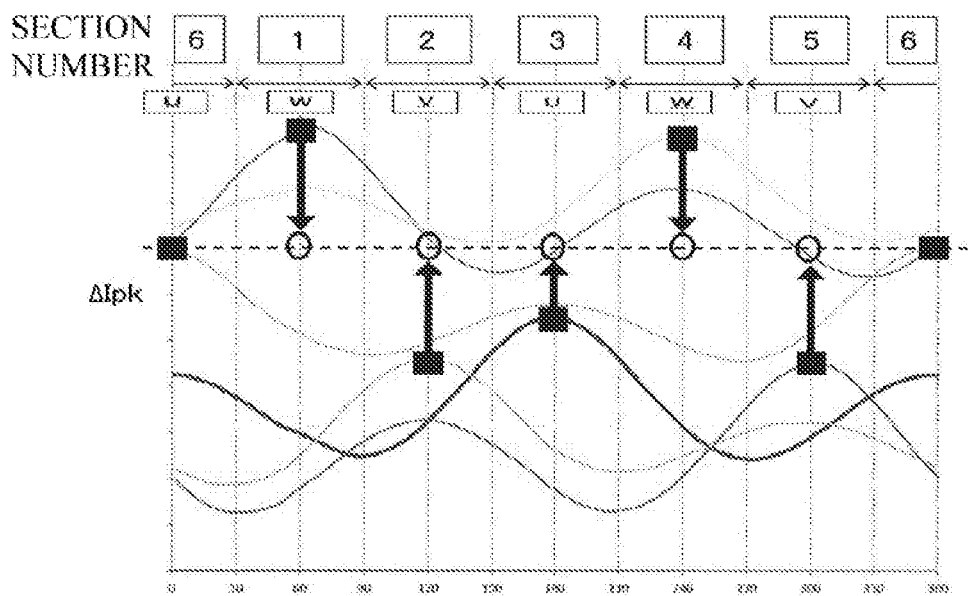
FIG. 8 is a waveform chart of waveforms of first measurement values for evaluation.

In FIG. 8, the first measurement values ■(maximum values) for the conduction patterns in the evaluation measurement are plotted. The six conduction patterns were performed, and the six measurement values of the conduction patterns are varied. For reference, waveforms of multipoint measurement are also shown in the drawing.

Then, the first measurement value of an optional phase is set as a standard value, and a correction coefficient A, which is used to make the first measurement values of the rest conduction patterns equal to the standard value, is obtained from a ratio of the measurement values of the conduction patterns. Further, the correction coefficient A may be obtained so as to make the second measurement values (minimum values) equal.

When the position detection is performed while the operation, the correction values are obtained by multiplying the measurement values by the correction coefficient A so as to correct offset errors. For reference, the correction values obtained by multiplying the first measurement values by the correction coefficient A are indicated by marks of ○.
As a result of correcting the offset errors, the peaks are linearly lined.

Next, a manner for correcting amplitude errors will be explained.

Figure 9:
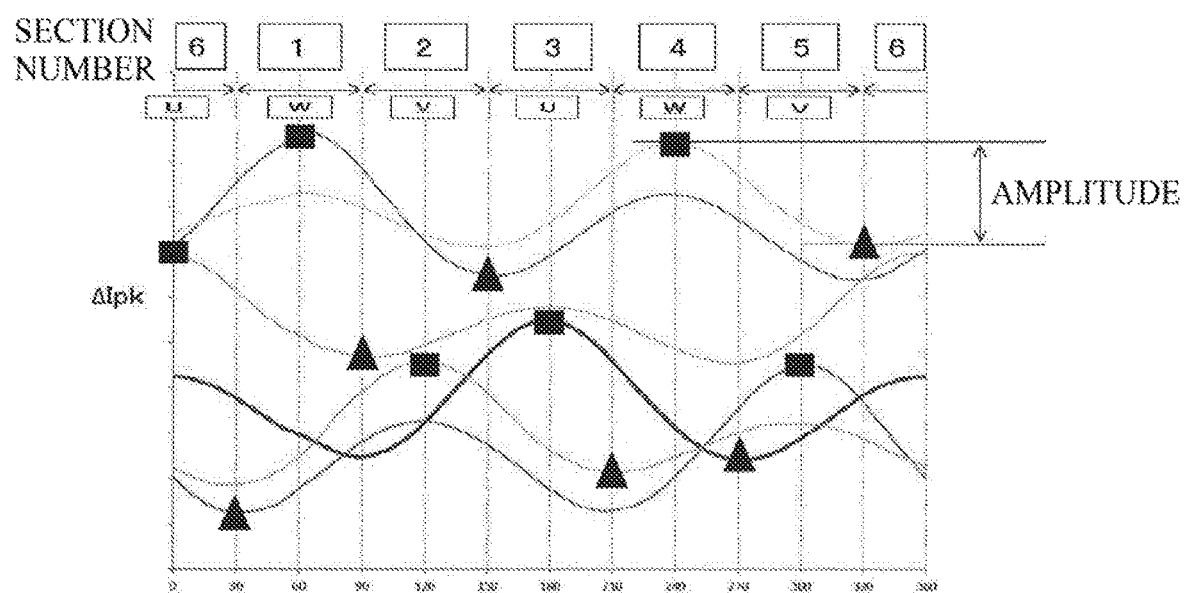
FIG. 9 is a waveform chart of waveforms of first measurement values and second measurement values for evaluation.

In FIG. 9, the first measurement values ■ (maximum values) and the second measurement values ▲ (minimum values) for the conduction patterns in the evaluation measurement are plotted. Number of the conduction patterns is six, and number of the measurement values is 12. For reference, waveforms of multipoint measurement are also shown in the drawing.

Then, a difference between the first measurement value and the second measurement value (the first measurement value–the second measurement value) for each conduction pattern is calculated so as to obtain an amplitude, which is a deviation of the detection signal. The amplitude of an optional phase is set as a standard value, and a correction coefficient B, which is used to make amplitudes of the rest conduction patterns equal to the standard value, is obtained for each of the sensing conduction patterns. The second measurement values and the correction coefficients B of the conduction patterns are stored in the nonvolatile memory 56.

When the position detection is performed while the operation, the correction values are obtained by multiplying the difference between each measurement value and the second measurement value [(the measurement value–the second measurement value)×the correction coefficient B] by the correction coefficient B for each of the conduction patterns so as to correct amplitude errors. The position of the permanent magnetic field (the rotor) is estimated on the basis of the correction value. Corrected waveforms shown in FIG. 7 are obtained by the above described manner, and the maximum values and the minimum values are linearly lined. In the above described amplitude error correction manner, two steps of correction calculation are required, but the errors can be highly reduced.

Note that, errors of the position detection signals occur in both of the motor and the driving circuit, it is preferable to perform the evaluation measurement when the combination of the both is settled. When the motor or the driving circuit is exchanged, the evaluation measurement must be performed so as to renew the correction coefficients.

Once the evaluation measurement is performed, further evaluation measurement is not required, and it is preferable to store the correction coefficients A and B or the second measurement values in the nonvolatile memory 56 so as to start the operation immediately after turning on the driving circuit.

Next, a manner for correcting amplitude errors by the MPU 51 will be explained.

The manner can be applied to the following three cases. Namely, 1. performing the evaluation measurement for obtaining the correction coefficients, which are used to correct errors of the stopping positions of the permanent magnetic field, before operation; 2. detecting an initial permanent magnetic field position (an initial position of the rotor) when starting the motor; and 3. detecting the permanent magnetic field positions at a low speed. The manner will be explained with program flows.

1. Program Flow of Evaluation Measurement Before Operation

Firstly, the evaluation measurement is stared. Positioning of the permanent magnetic field is performed at a position of an electric angle of 0° by the setup conduction (the forward-direction sensing conduction for the U-phase). The first measurement values are measured by the forward-direction sensing conduction for the U-phase, and the third measurement values are measured by the reverse-direction sensing conduction for the U-phase (note that, the second measurement values are measured, at a position of an electric angle of 90° ahead, by the reverse-direction sensing conduction for the U-phase.

The MPU 51 repeats the above described actions every time advancing 90° with changing the conduction pattern so as to obtain the first measurement values, the second measurement values and the third measurement values for the six conduction patterns.

Next, the correction coefficients A are obtained so as to make the first measurement values of all of the conduction patterns equal to the standard value of the optional phase.

Firstly, the calculation of "the first measurement value–the second measurement value" is performed for each of the conduction patterns so as to obtain amplitudes.

Next, the correction coefficients B are obtained so as to make the amplitudes of all of the conduction patterns equal to the standard value of the optional phase.

Then, the correction coefficients A and B and the second measurement values for each of the conduction patterns are stored in the nonvolatile memory 56.

Finally, performance is evaluated by reading the measurement values according to need.

The evaluation measurement is terminated.

2. Program Flow of Initial Position Detection when Starting

In the conduction pattern 1 (Section number 1) for starting the initial position detection, the measurement of detecting the position detection signal is repeated six times with applying sensing pulses, and measuring the position detection signal is performed for the conduction patterns 1-6. (Section Number 1-6)

Next, the calculation of "(the measurement value–the second measurement value)×the correction coefficient B" is performed for each of the conduction patterns so as to obtain the correction values, in which the amplitude errors are corrected (the correction values are obtained by calculation of "the measurement value×the correction coefficient A" when correcting offset errors).

The MPU 51 estimates the initial position of the rotor on the basis of the correction value. By the above described actions, the step of detecting the initial rotor position is completed. Then, electricity is supplied from the constant voltage DC power source on the basis of the estimated rotor position, so that starting excitation is started by 120° rectangular-wave conduction.

3. Program Flow of Position Detection at Low Speed

Driving excitation is once stopped, and then detecting the rotor position is started. The sensing conduction is performed for the conduction pattern corresponding to the present position of the rotor so as to measure the position detection signal. The measurement actions are performed for only the required conduction pattern or patterns to detect the position.

Next, the calculation of "(the measurement value−the second measurement value)×the correction coefficient B" is performed for each of the conduction patterns so as to obtain the correction values, in which the amplitude errors are corrected (the correction values are obtained by calculation of "the measurement value×the correction coefficient A" when correcting offset errors).

The MPU 51 estimates the present position of the rotor on the basis of the correction value. The MPU 51 renews conduction patterns and completes the position detection. Then, electricity is supplied from the constant voltage DC power source on the basis of the estimated rotor position, so that driving excitation is restarted by 120° rectangular-wave conduction.

Note that, the correction coefficients A and B may be obtained by other positioning manners when performing the measurement other than the self-excitation positioning, so the positioning, for example, may be performed by connecting an external driving unit (e.g., stepping motor) to the output shaft of the motor and rotating the output shaft a prescribed angle by the external driving unit.

In case of using an external force to perform the positioning, phase errors occur in the measurement, but they are minute and can be ignored.

Note that, the above described principles for position detection, the structure of the motor and the structure of the programs may be variously varied, and they are not limited to the above described embodiment, so other principles for position detection, other circuit structures and other program structures which are modified, by motor designers, electronic engineers and programmers, without deviating from the spirit of the present invention are included in the scope of the present invention.

What is claimed is:

1. A method for correcting a magnetic field position error in an electric motor which comprises a rotor having a permanent magnetic field and a stator having star-connected three-phase coils U, V and W and which is started by supplying constant voltage DC electric power and applying 120° rectangular-wave, said electric motor further comprising:

output means for applying electricity to the three-phase coils through a three-phase half-bridge type invertor circuit;

control means for switching-controlling the output means, according to a rotation command from a superordinate controller, so as to switch an exciting state; and current detection means for detecting coil currents, the current detection means being connected to an earth-side terminal of the output means, wherein a conduction direction from a coil end to a common side is a forward direction, a conduction direction from the common side to the coil end is a reverse direction, and one phase coil is defined as a phase to be measured in six conduction patterns, in which electric conductions are performed in a reverse direction for the U-phase, a forward direction for the W-phase, a reverse direction for the V-phase, a forward direction for the U-phase, a reverse direction for the W-phase and a forward direction for the V-phase in this order, at a pitch of an electric angle of 60° from an electric angle of 0° where a polar direction of a coil to be measured and a polar direction of a permanent magnetic field are opposite to each other, wherein, in a state where an output shaft of the electric motor is released, the control means performing:

a step of controlling the output means so as to perform stationary excitation in a prescribed conduction pattern and perform self-excitation positioning of the permanent magnetic field at a pitch of an electric angle of 60° from the electric angle of 0°;

a step of measuring coil current values, which are detected by the current detection means when performing three-phase sensing conduction in which one-phase conduction is performed in the phase to be measured, is performed at each stopping position of the permanent magnetic field, and storing the coil current values as first measurement values;

a step of measuring coil current values, which are detected by the current detection means when three-phase sensing conduction is performed, in the reverse directions, still at the stopping position of the permanent magnetic field and storing the coil current values as third measurement values;

a step of measuring coil current values, which are detected by the current detection means when three-phase sensing conduction is performed, in the directions for measuring the first measurement values, at positions of the permanent magnetic field rotated an electric angle of 90° from the stopping positions where self-excitation positioning is performed, and storing the coil current values as second measurement values;

a step of obtaining coil current values of the phase to be measured, which correspond to the first measurement value, the second measurement value and the third measurement value, for each of the six conduction patterns and storing the coil current values in the control means; and a step of calculating correction coefficients A, which are used to make a standard value of an optional phase, which is the first measurement value or the second measurement value thereof, equal to the measurement values of the rest five phases, for each of the six conduction patterns and storing the correction coefficients A in the control means, and wherein the control means obtains a correction value in which an offset error has been corrected by multiplying the first measurement value or the second measurement value, which are measured for each of the six conduction patterns when an offset error occurs during the position detection of the permanent magnetic field, by the correction coefficient A and estimates the position of the permanent magnetic field on the basis of the correction value.

2. The method for correcting a magnetic field position error in an electric motor according to claim 1, wherein an external driving unit is connected to the output shaft of the electric motor, and the output shaft of the electric motor is rotated a prescribed angle, by the external driving unit, so as to position the same.

3. A method for correcting a magnetic field position error in an electric motor which comprises a rotor having a permanent magnetic field and a stator having star-connected three-phase coils U, V and W and which is started by supplying constant voltage DC electric power and applying 120° rectangular-wave, said electric motor further comprising:

output means for applying electricity to the three-phase coils through a three-phase half-bridge type invertor circuit;

control means for switching-controlling the output means, according to a rotation command from a superordinate controller, so as to switch an exciting state; and current detection means for detecting coil currents, the current detection means being connected to an earth-side terminal of the output means, wherein a conduction direction from a coil end to a common side is a forward direction, a conduction direction from the common side to the coil end is a reverse direction, and one phase coil is defined as a phase to be measured in six conduction patterns, in which electric conductions are performed in a reverse direction for the U-phase, a forward direction for the W-phase, a reverse direction for the V-phase, a forward direction for the U-phase, a reverse direction for the W-phase and a forward direction for the V-phase in this order, at a pitch of an electric angle of 60° from an electric angle of 0° where a polar direction of a coil to be measured and a polar direction of a permanent magnetic field are opposite to each other, wherein, in a state where an output shaft of the electric motor is released, the control means performing:

a step of controlling the output means so as to perform stationary excitation in a prescribed conduction pattern and perform self-excitation positioning of the permanent magnetic field at a pitch of an electric angle of 60° from the electric angle of 0°;

a step of measuring coil current values, which are detected by the current detection means when performing three-phase sensing conduction in which one-phase conduction is performed in the phase to be measured, is performed at each stopping position of the permanent magnetic field, and storing the coil current values as first measurement values;

a step of measuring coil current values, which are detected by the current detection means when three-phase sensing conduction is performed, in the directions for measuring the first measurement values, at positions of the permanent magnetic field rotated an electric angle of 90° from the stopping positions where self-excitation positioning is performed, and storing the coil current values as second measurement values;

a step of obtaining coil current values of the phase to be measured, which correspond to the first measurement value and the second measurement value, for each of the six conduction patterns and storing the coil current values in the control means; and a step of obtaining correction coefficients B, which is used to make a standard value of an optional phase, which is an amplitude of deviation of detection signals obtained from a difference between the first measurement value and the second measurement value, equal to amplitudes of the rest five phases, for each of the six conduction patterns and storing the second measurement values and the correction coefficients B, and wherein the control means obtains a correction value in which an amplitude error has been corrected by multiplying a difference between the measurement value of the coil current and the second measurement value, which are measured for each of the six conduction patterns, by the correction coefficient B and estimates the position of the permanent magnetic field on the basis of the correction value.

4. The method for correcting a magnetic field position error in an electric motor according to claim 3, wherein an external driving unit is connected to the output shaft of the electric motor, and the output shaft of the electric motor is rotated a prescribed angle, by the external driving unit, so as to position the same.

* * * * *